W. STROUSE & W. E. CLARK.
BOLT OPERATING MECHANISM.
APPLICATION FILED JULY 18, 1911.
1,019,282.
Patented Mar. 5, 1912.
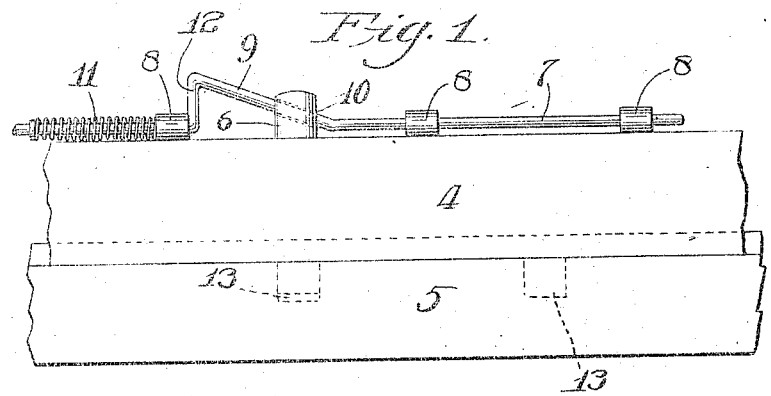
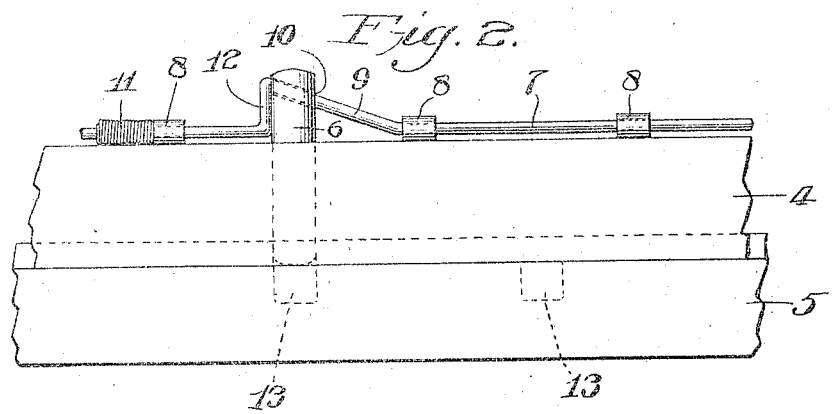
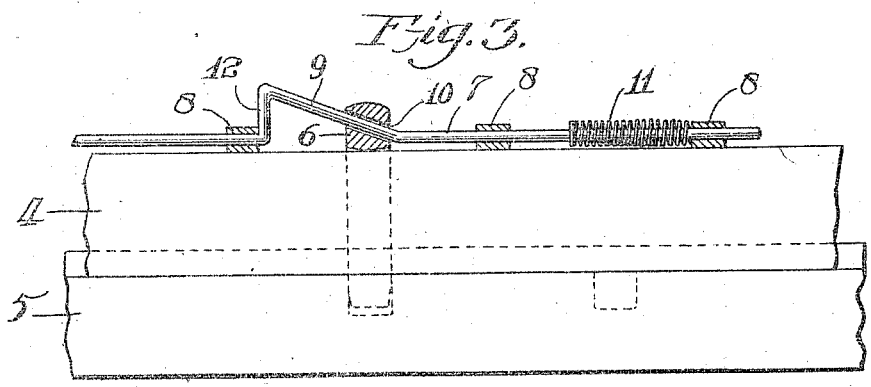
INVENTORS
William Strouse
Walter E. Clark
BY
Chas. A. Reitter
ATTORNEY
WITNESSES

UNITED STATES PATENT OFFICE.

WILLIAM STROUSE AND WALTER E. CLARK, OF HUGHESVILLE, PENNSYLVANIA; SAID STROUSE ASSIGNOR TO J. K. RISHEL FURNITURE CO., OF WILLIAMSPORT, PENNSYLVANIA, A CORPORATION OF PENNSYLVANIA.

BOLT-OPERATING MECHANISM.

1,019,282.   Specification of Letters Patent.   Patented Mar. 5, 1912.

Application filed July 18, 1911. Serial No. 639,100.

*To all whom it may concern:*

Be it known that we, WILLIAM STROUSE and WALTER E. CLARK, citizens of the United States, and residents of Hughesville, in the county of Lycoming and State of Pennsylvania, have invented certain new and useful Improvements in Bolt-Operating Mechanism, of which the following is a specification.

Our invention relates to improvements in bolt operating mechanism and while our invention may be of general application it is intended more particularly for operating the bolts employed for locking extension table slides.

Our invention is illustrated in the accompanying drawings in which—

Figure 1 is a plan view of parts of the mating slides of an extension table fitted with our improved bolt which is shown in its seated or locked position; Fig. 2 a similar view the bolt being lifted from its seat; Fig. 3 a modified construction showing the spring to the right of the bolt which latter is shown partly in section.

4 and 5 are mating slides of an extension table one of which is adapted to be moved longitudinally of the other. 6 is a bolt carried by one of the slides and adapted to be seated in a suitable hole in the other slide in order to prevent any movement of one slide relatively to the other when the bolt is seated. So far the arrangement is well known.

7 is a rod, carried by and longitudinally movable in keepers 8, one portion 9 of which is bent upward to form a cam which passes through a diagonal hole 10 in the bolt 6.

11 is a spring for normally keeping the rod 7 in the position shown in Fig. 1 and the bolt in its lowest or seated position. The rod 7 passes completely through the bolt 6 its ends being at right angles to the bolt and there are keepers at both sides of the bolt to receive and guide these ends to insure the cam portion from moving out of line and binding in the bolt during its movements. The spring 11 may be arranged as shown in either Figs. 1 or 3.

To unseat the bolt from the hole 13 in the slide 5 the operator pushes the vertical part 12 of the rod 7 to the right causing the part 9 of the rod to travel through the diagonal hole 10 in the bolt 6—this lifts the bolt from the hole 13 when the slides 4 or 5 may be drawn past one another the desired distance.

There are in the slide 5 as many holes 13 for the bolt 6 as may be necessary for various adjustments of the slides and as the bolt comes opposite any one of these holes it is pushed therein by the combined action of the spring 11 and the part 9 of the rod 7.

Having thus described our invention we claim as new and desire to secure by Letters Patent:—

In a bolt operating mechanism, in combination, a bolt with a diagonal perforation therethrough, a rod an interior portion of which is bent to form an inclined portion which passes through said perforation and the end portions of which are at right angles to the bolt, keepers upon both sides of said bolt through which the end portions of said rod freely pass, and a spring for normally holding the inclined portion of said rod so as to keep said bolt in its lowered position.

WILLIAM STROUSE.
WALTER E. CLARK.

Witnesses:
WM. S. BARTO,
CAMERON BOAK.